US009590847B2

United States Patent
Hajduczenia et al.

(10) Patent No.: US 9,590,847 B2
(45) Date of Patent: Mar. 7, 2017

(54) AUTO-CONFIGURATION OF DEMARCATION DEVICES IN ETHERNET PASSIVE OPTICAL NETWORK

(75) Inventors: Marek Hajduczenia, Fiaes (PT); Meiyan Zang, Shanghai (CN)

(73) Assignees: ZTE Corporation, Shenzhen (CN); ZTE Portugal-Projectos de Telecommunicações Unipessoal Lda, Lisbon (PT)

( * ) Notice: Subject to any disclaimer, the term of this patent is extended or adjusted under 35 U.S.C. 154(b) by 205 days.

(21) Appl. No.: 13/985,861

(22) PCT Filed: Feb. 15, 2012
(Under 37 CFR 1.47)

(86) PCT No.: PCT/IB2012/003031
§ 371 (c)(1),
(2), (4) Date: Mar. 26, 2014

(87) PCT Pub. No.: WO2013/064912
PCT Pub. Date: May 10, 2013

(65) Prior Publication Data
US 2014/0334822 A1    Nov. 13, 2014

Related U.S. Application Data

(60) Provisional application No. 61/443,188, filed on Feb. 15, 2011, provisional application No. 61/451,100, filed on Mar. 9, 2011.

(51) Int. Cl.
*H04L 12/24* (2006.01)
*H04L 12/28* (2006.01)
(Continued)

(52) U.S. Cl.
CPC ......... *H04L 41/0806* (2013.01); *H04B 10/27* (2013.01); *H04L 12/2876* (2013.01);
(Continued)

(58) Field of Classification Search
None
See application file for complete search history.

(56) References Cited

U.S. PATENT DOCUMENTS

| 8,989,591 B2 * | 3/2015 | Kauffeldt et al. ............ 398/140 |
| 2002/0052190 A1 * | 5/2002 | Bristow ................. H04M 3/42 455/405 |

(Continued)

FOREIGN PATENT DOCUMENTS

| CN | 101159597 A | 4/2008 |
| CN | 101277185 A | 10/2008 |
| CN | 101448184 A | 6/2009 |

OTHER PUBLICATIONS

Canadian Office Action mailed on Feb. 24, 2015 for Canadian Application No. 2,827,371, filed Feb. 15, 2012 (5 pages).
(Continued)

*Primary Examiner* — Donald Mills
(74) *Attorney, Agent, or Firm* — Perkins Coie LLP

(57) ABSTRACT

Systems, devices and techniques for automatically configuring a Demarcation device in a communication network based on DOCSIS provisioning over EPON. A method can be implemented to include initializing a Demarcation device and an optical network unit device (ONU) that is connected to the Demarcation device; operating the Demarcation device to establish a communication with the ONU and to obtain configuration information of the ONU; operating the Demarcation device to communicate to a back-office system in the network regarding information of the Demarcation device, the information including capabilities associated with the Demarcation device; operating the back-office system to generate a service configuration file and to send the generated service configuration file to the Demarcation device; and operating the Demarcation device to process the service configuration file from the back-office system and to
(Continued)

An example for providing auto configuration of a Demarcation device in a communication network based on DOCSIS provisioning over EPON update communication services provided by the ONU based on the service configuration file from the back-office system.

16 Claims, 7 Drawing Sheets

(51) Int. Cl.
    *H04Q 11/00*     (2006.01)
    *H04B 10/27*     (2013.01)

(52) U.S. Cl.
    CPC ..... *H04Q 11/0067* (2013.01); *H04Q 11/0071* (2013.01); *H04Q 2011/0064* (2013.01); *H04Q 2011/0079* (2013.01); *Y02B 60/43* (2013.01); *Y02B 60/44* (2013.01)

(56) References Cited

U.S. PATENT DOCUMENTS

| | | | |
|---|---|---|---|
| 2003/0149756 A1* | 8/2003 | Grieve | H04L 41/0869 709/223 |
| 2007/0083628 A1* | 4/2007 | Sandstrom | H04L 41/044 709/223 |
| 2008/0010358 A1* | 1/2008 | Jin | 709/207 |
| 2008/0232801 A1* | 9/2008 | Arnold et al. | 398/58 |
| 2008/0244271 A1 | 10/2008 | Yu | |
| 2009/0060509 A1* | 3/2009 | Shimoosako | H04J 3/1694 398/66 |
| 2011/0072119 A1* | 3/2011 | Bronstein et al. | 709/222 |
| 2011/0131624 A1* | 6/2011 | Wu | 725/111 |
| 2012/0030320 A1* | 2/2012 | Diab et al. | 709/220 |
| 2014/0023366 A1 | 1/2014 | Zang et al. | |

OTHER PUBLICATIONS

International Search Report and Written Opinion mailed on Aug. 1, 2013 for International Application No. PCT/IB2012/003031, filed Feb. 15, 2012 (6 pages).

Cable Data Services, "DPoE™ Physical Layer Specification," DOCSIS® Provisioning of EPON Specifications, DPoE-SP-PHYv1.0-I01-110225, 22 pages, Feb. 2011.

* cited by examiner

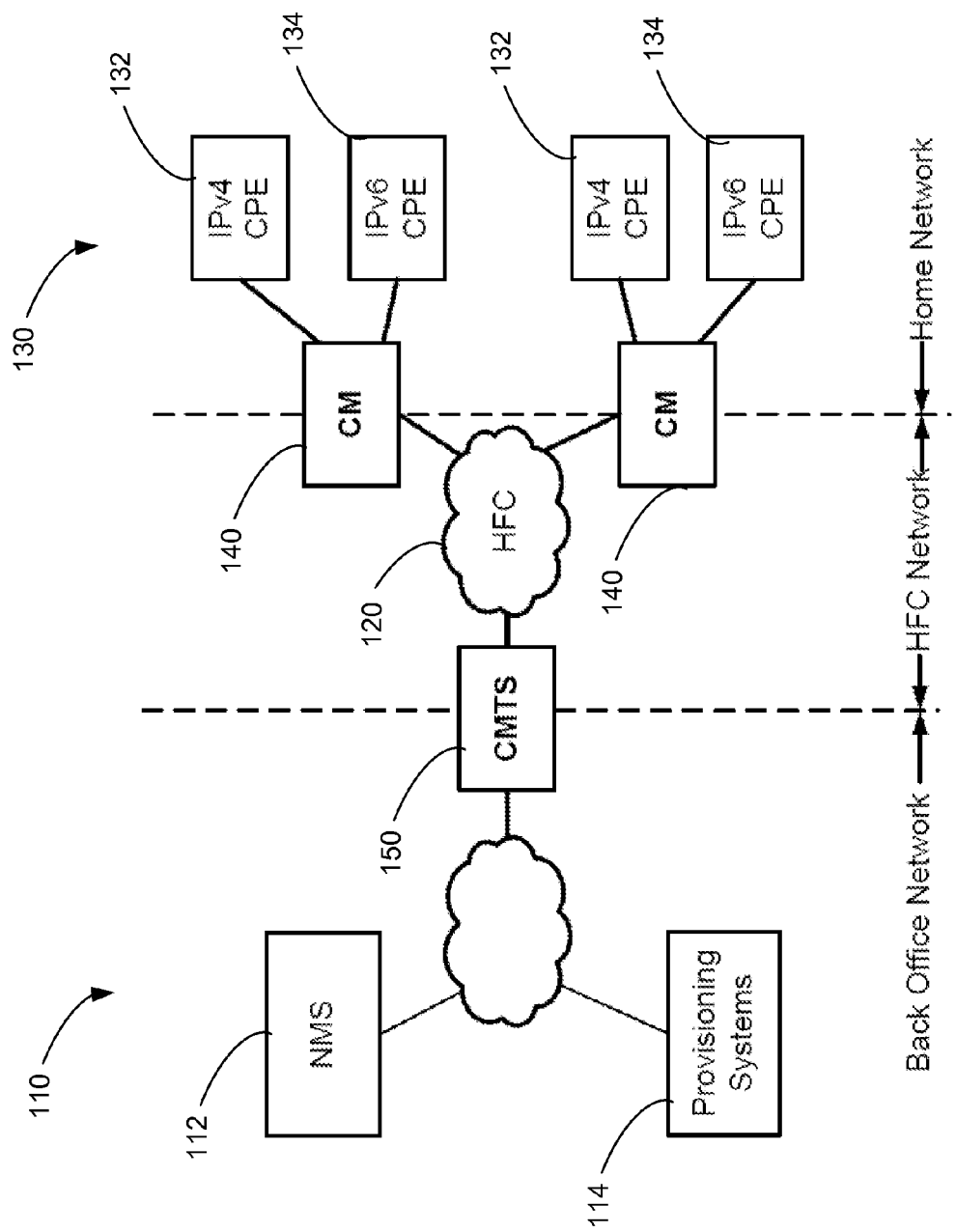
FIG. 1 DOCSIS Architecture

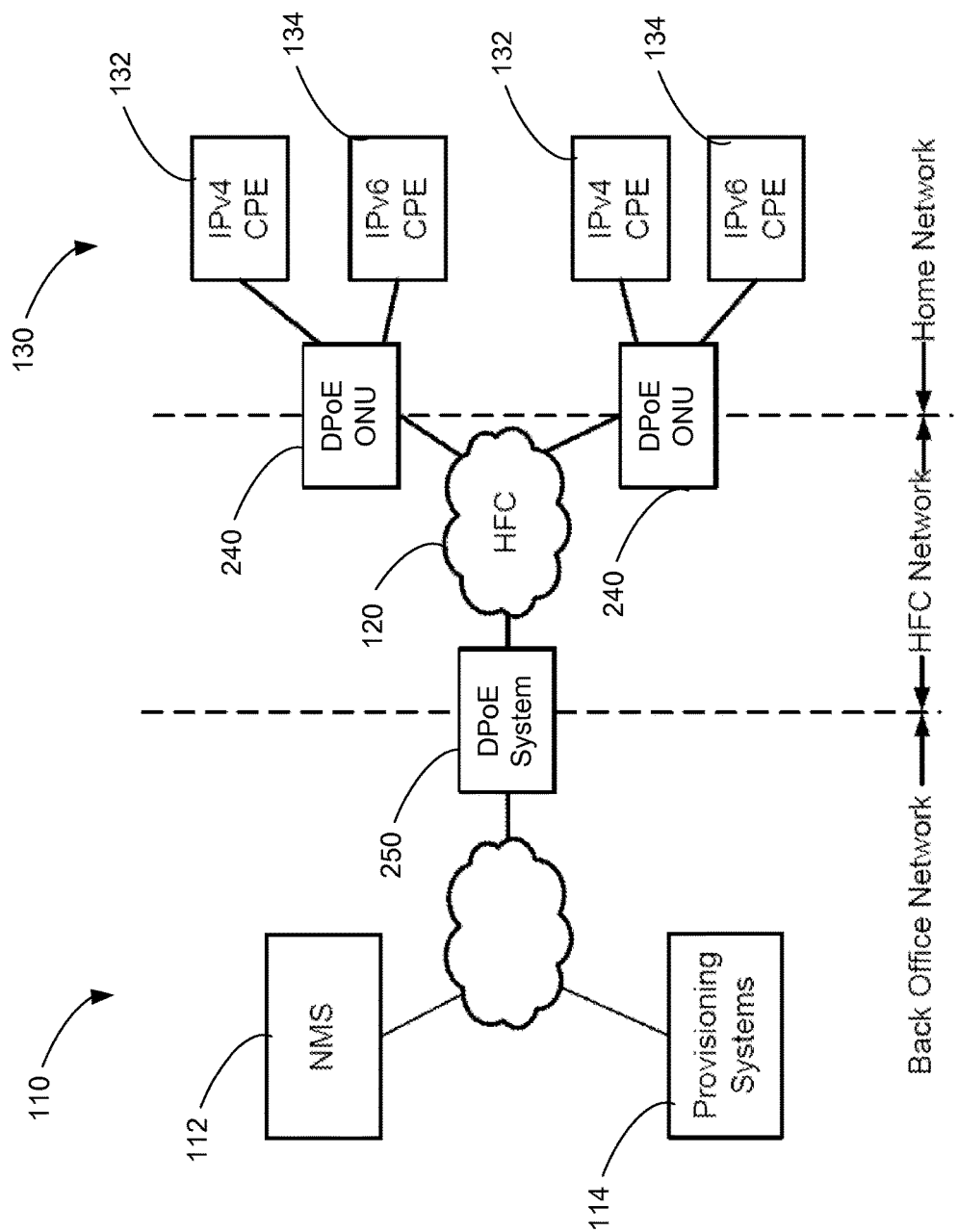
FIG. 2A DPoE based on DOCSIS Architecture

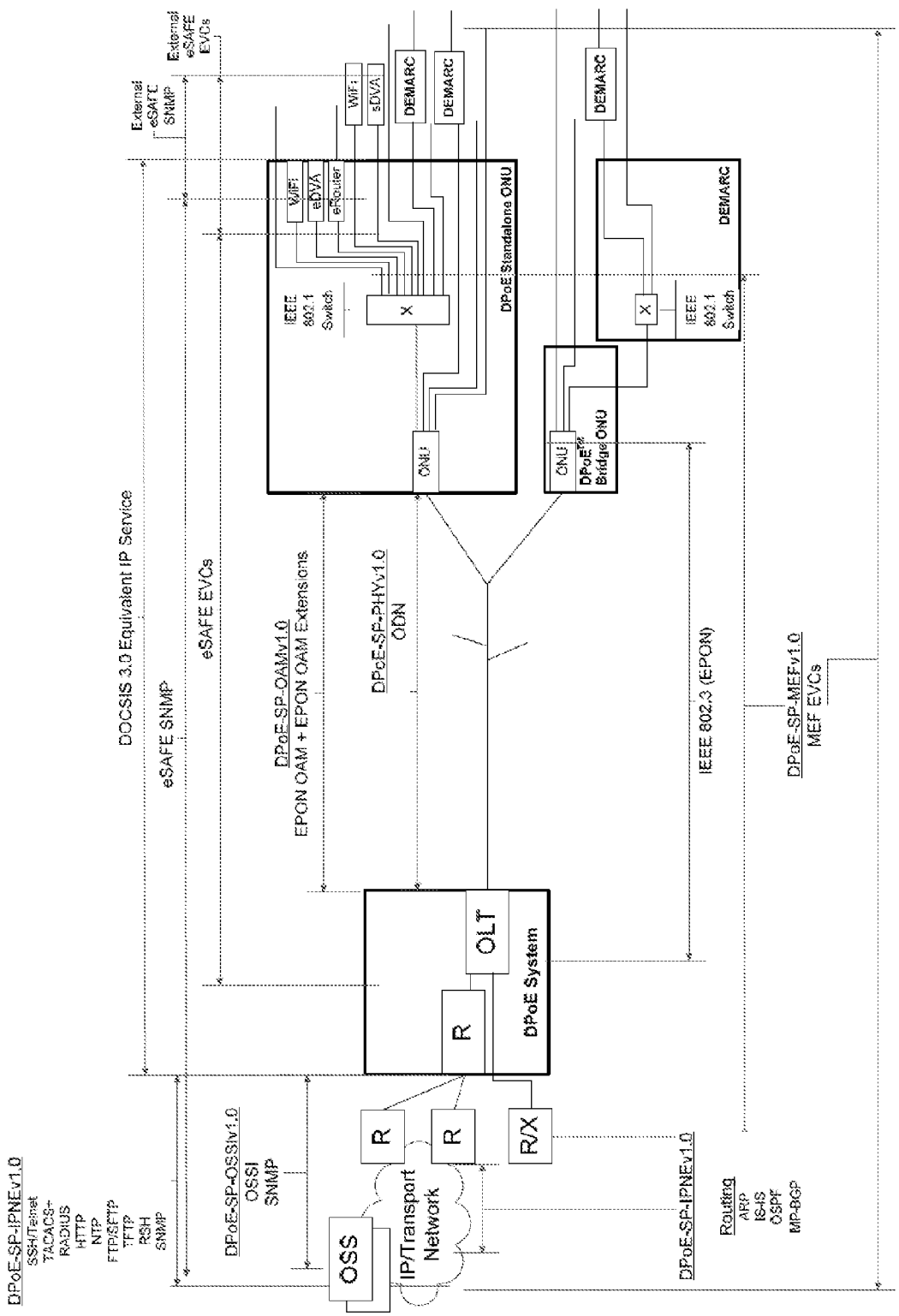
FIG. 2B DPoE based on DOCSIS Architecture

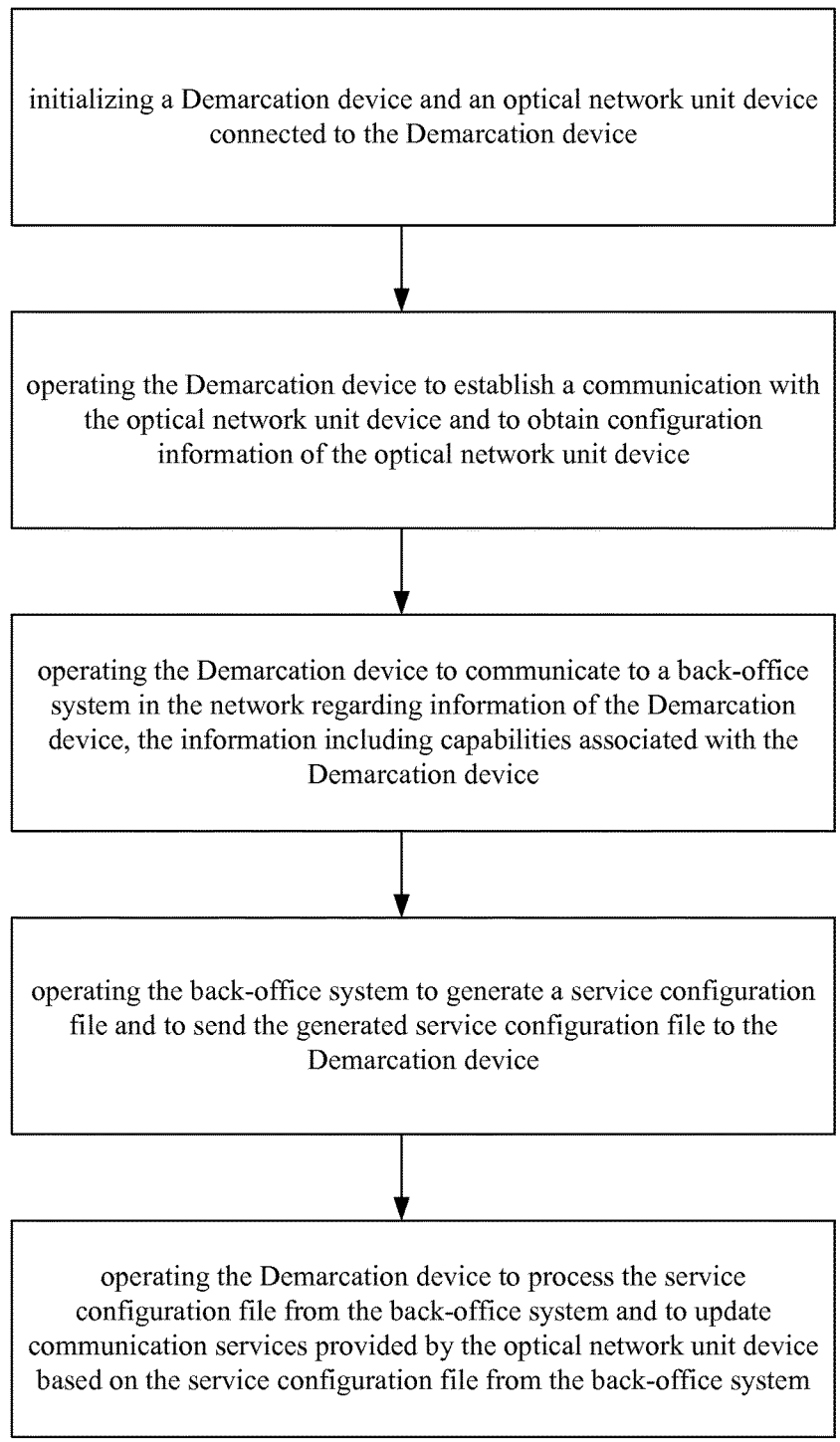
FIG. 3: An example for providing auto configuration of a Demarcation device in a communication network based on DOCSIS provisioning over EPON

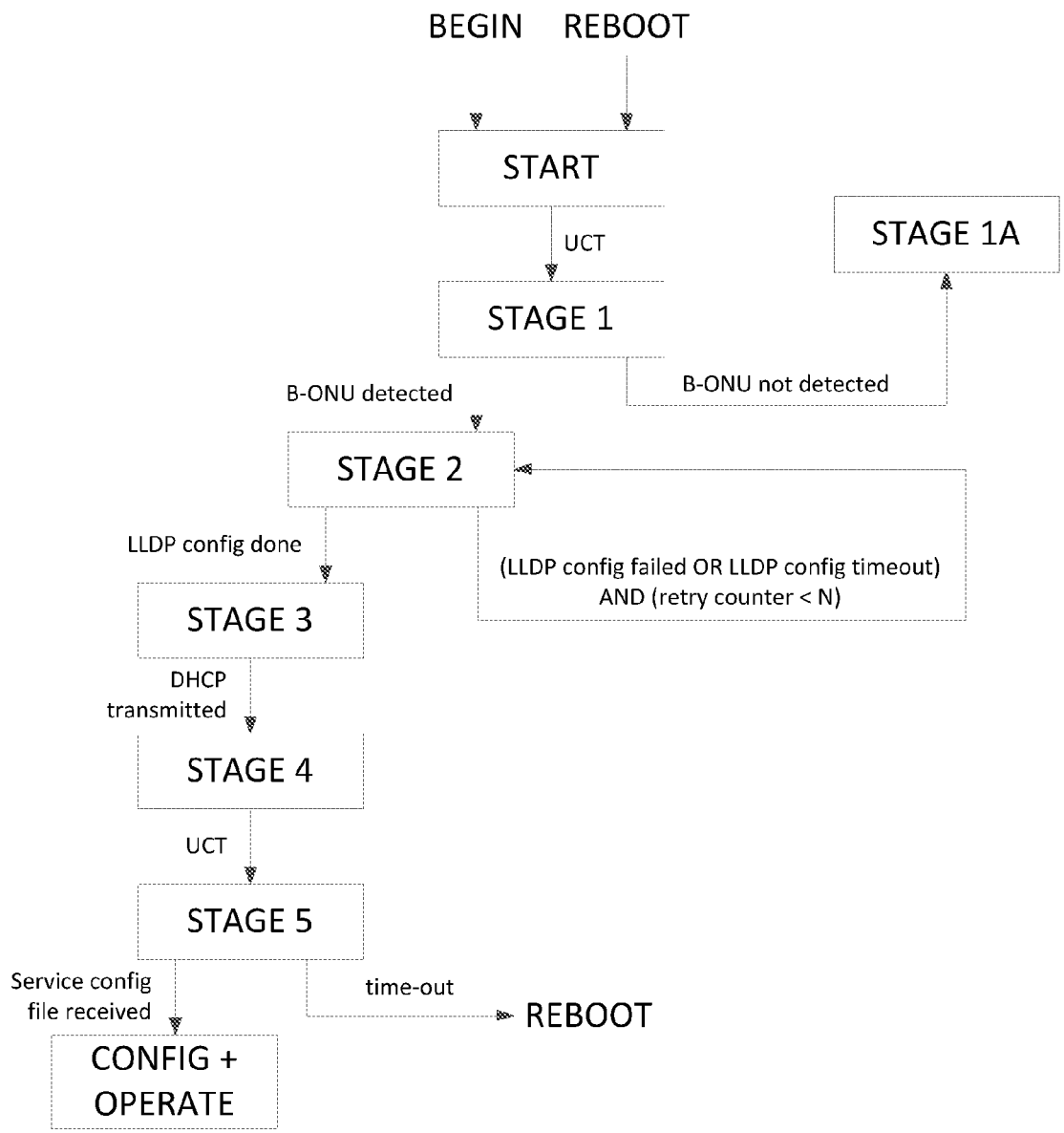
FIG. 4A: Flow chart for the first example of automated configuration for Demarcation device

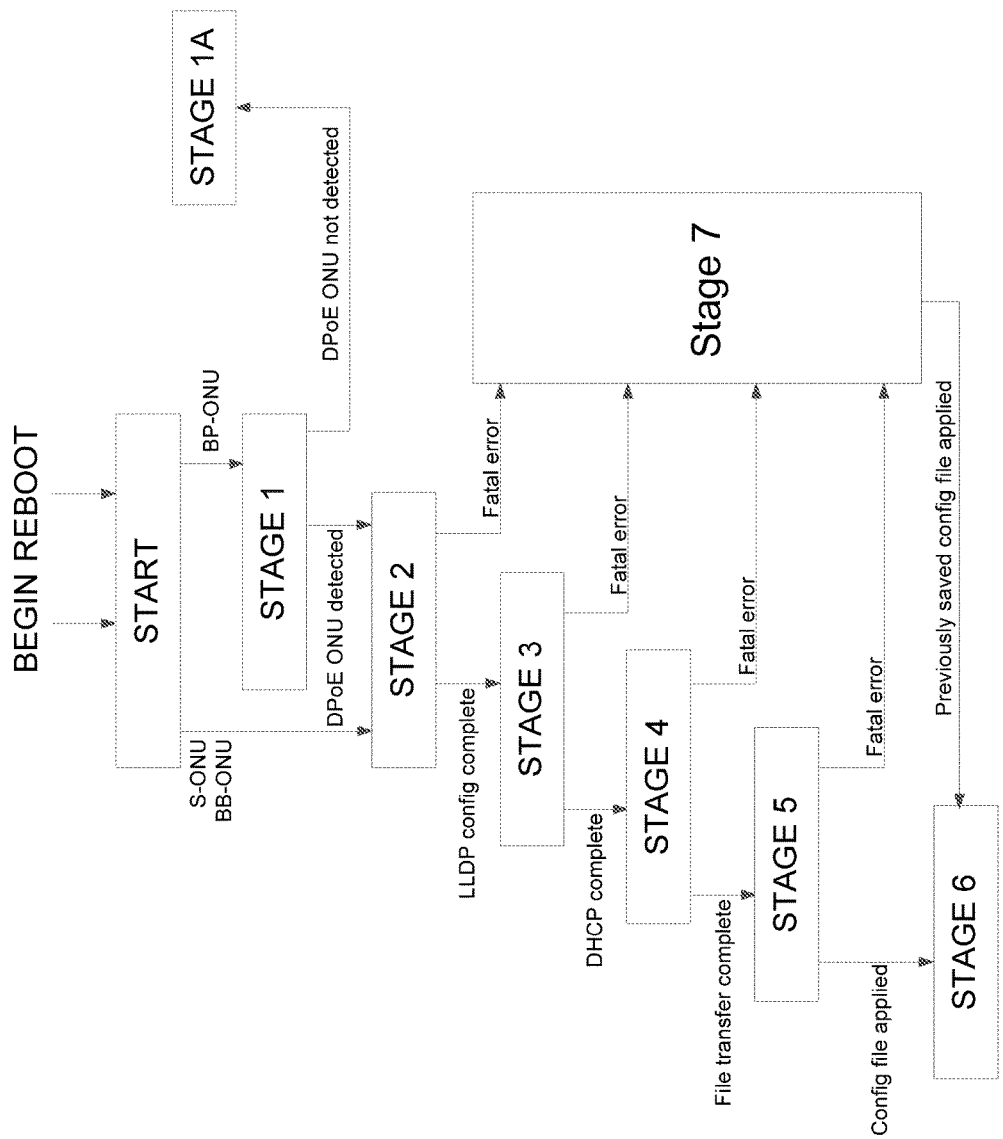
FIG. 4B: Flow chart for the second example for the automated configuration for Demarcation device

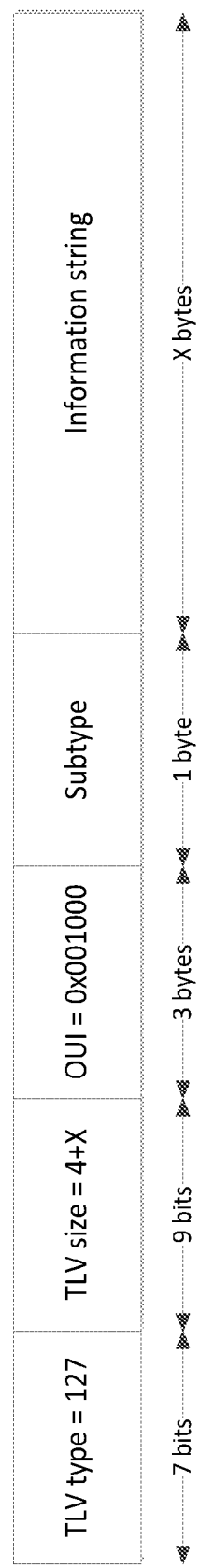
FIG. 5: Structure of the DPoE-specific TLV for LLDP

AUTO-CONFIGURATION OF DEMARCATION DEVICES IN ETHERNET PASSIVE OPTICAL NETWORK

PRIORITY CLAIMS AND RELATED APPLICATIONS

This PCT patent application claim priority to U.S. Provisional Application No. 61/443,188, filed Feb. 15, 2011, entitled "AUTO-CONFIGURATION OF DEMARCATION DEVICES IN ETHERNET PASSIVE OPTICAL NETWORK", and U.S. Provisional Application No. 61/451,100, filed Mar. 9, 2011, entitled "AUTO-CONFIGURATION OF DEMARCATION DEVICES IN ETHERNET PASSIVE OPTICAL NETWORK". The entire contents of the before-mentioned patent applications are incorporated by reference as part of the disclosure of this application.

TECHNICAL FIELD

This patent document relates to systems, devices and techniques for data communications in an Ethernet Passive Optical Network (EPON).

BACKGROUND

Data Over Cable Service Interface Specification (DOCSIS) is a telecommunications standard that permits the addition of high-speed data transfer to an existing Cable TV (CATV) system. DOCSIS is employed by cable television operators to provide data services such as Internet over the hybrid fiber coaxial (HFC) infrastructure. Ethernet Passive Optical Network (EPON) is an optical network architecture based on point to multipoint (P2MP) topology in which a single optical fiber and multiple passive optical splitters are used to provide services from a central office or headend to multiple customer premises. EPON uses a point to point (P2P) Emulation Sublayer to render the P2MP network to appear as a collection of P2P links to the higher protocol layers. A network Operations, Administration and Maintenance (OAM) mechanism is included in EPON to facilitate operations and management of EPON.

DPoE (DOCSIS Provisioning over EPON) uses EPON and a DOCSIS Mediation Layer (DML) solution to provide the translation between the EPON and the DOCSIS back-office systems for provisioning of DOCSIS services.

SUMMARY

This patent document provides, among others, systems, devices and techniques for automatically configuring a Demarcation device in a communication network based on DOCSIS provisioning over EPON.

In one aspect, a method is described for providing auto configuration of a Demarcation device in a communication network based on DOCSIS provisioning over EPON. This method includes initializing a Demarcation device and an optical network unit device that is connected to the Demarcation device; operating the Demarcation device to establish a communication with the optical network unit device and to obtain configuration information of the optical network unit device; operating the Demarcation device to communicate to a back-office system in the network regarding information of the Demarcation device, the information including capabilities associated with the Demarcation device; operating the back-office system to generate a service configuration file and to send the generated service configuration file to the Demarcation device; and operating the Demarcation device to process the service configuration file from the back-office system and to update communication services provided by the optical network unit device based on the service configuration file from the back-office system. The optical network unit device can be in various configurations, e.g., a bridge optical network unit device that is plugged to the Demarcation device or is connected to the Demarcation device via a communication link, with a single stand-alone optical network unit capable of connecting to more than one Demarcation device simultaneously.

In one aspect, a method is described for providing auto configuration of a Demarcation device based on DOCSIS provisioning over EPON. This method includes initializing a Demarcation device and an optical network unit device (in case of a bridge optical network unit device, which is plugged into the Demarcation device; in case of a stand-alone optical network unit device, which is connected to the said Demarcation device via any of the physical interfaces supported by the said optical network unit); operating the Demarcation device to establish a communication with the said optical network unit device and to obtain configuration information of the optical network unit device; operating the Demarcation device to communicate to a back-office system in the network regarding information of the Demarcation device where the information including capabilities associated with the Demarcation device; operating the back-office system to generate a service configuration file and to send the generated service configuration file to the Demarcation device; and operating the Demarcation device to process the service configuration file from the back-office system and to update communication services provided by the optical network unit device based on the service configuration file from the back-office system.

This and other aspects and their implementations are described in greater detail in the drawings, the description and the claims.

BRIEF DESCRIPTION OF DRAWINGS

FIG. 1 illustrates an example of a DOCSIS architecture.

FIG. 2A illustrates an example of a DPoE network system based on the DOCSIS architecture in FIG. 1.

FIG. 2B shows a specific example of a DPoE network system with demarcation devices FIG. 3 shows an example of a method for providing auto configuration of a Demarcation device in a communication network based on DOCSIS provisioning over EPON.

FIGS. 4A and 4B show two examples for implementing the automated configuration of the demarcation devices.

FIG. 5 shows an example of a structure of the DPoE-specific TLV for Link Layer Discovery Protocol (LLDP).

DETAILED DESCRIPTION

FIG. 1 illustrates a DOCSIS architecture which includes a back office network or system 110, a HFC network 120 and a home network 130. The back-office system 110 can manage equipment and devices developed for different access specifications can include various modules, such as a Network Management System (NMS) 112, provisioning systems 114, a subscriber management system, security system, performance and fault monitoring system.

A cable modem (CM) 140 is located at a customer premise as a communication interface between the HFC network 120 and one or more customer premise equipment (CPE) devices 132 and 134 in the home network 130. The CM 140 connects to the operator's HFC network 120 and to the home network 130, bridging packets between them. In various implementations, the CPE devices 132 and 134 can be embedded with the CM 140 in a single device, or can be separate standalone devices as illustrated. Examples of some CPE devices are home routers, set-top devices and personal computers. A cable modem termination system (CMTS) 150 is located at the CATV headend. Cable systems supporting on-demand programming can use a hybrid fiber-coaxial system. Fiber optic lines bring digital signals to nodes in the system where the digital signals are converted into RF channels and modem signals on coaxial trunk lines. The CMTS 150 connects the operator's back office 110 and core network with the HFC network 120. CMTS 150 forwards packets between these two domains, and between upstream and downstream channels on the HFC network 120.

DPoE (DOCSIS Provisioning over EPON) uses EPON and a DOCSIS Mediation Layer (DML) solution to provide the translation between the EPON and the DOCSIS back-office systems for provisioning of DOCSIS services. FIG. 2A illustrates an example of DPoE system based on the DOCSIS architecture in FIG. 1 where a DPoE system 250 replaces in CMTS 120 in FIG. 1 and DPoE ONUs 240 replace the CMs 140 in FIG. 1. The DPoE system 250 can include network elements that provide the DPoE function within the operator's network facilities. For example, the DPoE system 250 can include the EPON optical line termination (OLT) function, DOCSIS service functions, Metro Ethernet service functions, and IP network element management, routing and forwarding functions. Details of this architecture, and expected roles and functionalities of specific network elements, e.g., a Demarcation device, one or more DPoE Optical Network Units (ONUs) such as a DPoE Bridge Optical Network Unit (B-ONU) or DPoE Standalone Optical network Unit (S-ONU), the DPoE System, can be found in the DPoE-SP-ARCH standard, published by Cable-Labs.

FIG. 2B shows a specific example of a DPoE network with demarcation devices indicated by "DEMARC" labelled boxes. Each demarcation device can be owned and operated by the operator that provides the demarcation to the customer in form of a User Network Interface (UNI). A demarcation device can be the CPE or the Network Interface Device (NID).

The DPoE reference architecture identifies the elements that a DPoE Network minimally requires to illustrate and communicate the physical hardware and logical software interfaces between the functional subsystems of the DPoE architecture. The elements in FIG. 2B include the DPoE System that resides in the operator network, and the DPoE ONU which may be an EPON ONU, EPON SFP-ONU, or an EPON ONU with additional subsystems. The remaining elements in the architecture are servers and systems in the operator's network. The server elements have connectivity through an IP (TCP/IP) network. Transport of bearer traffic, and (in some cases) Layer 2 Ethernet Operation, Administration and Maintenance (OAM) signalling are available through either IP or Layer 2 Ethernet-based Network Interfaces.

This document provides examples of techniques for auto-configuration of Demarcation devices in DPoE when operated with a DPoE ONU as in the systems in FIGS. 2A and 2B. A DPoE ONU can be implemented as, e.g., a Bridge ONU (B-ONU) that is plugged into the available receptacle on a Demarcation device or a Standalone ONU (S-ONU) that is connected to a Demarcation device using a data link such as an Ethernet or other suitable data connection.

Techniques for auto-configuration can be used to guarantee that the Demarcation device can be properly auto-configured to receive the configuration files from the DOCSIS back-office system and interact with the DPoE ONU unit when plugged into the receptacle. The described auto-configuration of Demarcation devices can be applied to operation of various ONUs, e.g., pluggable SFP/SFP+/XFP type B-ONUs, and B-ONUs housed in new formats of pluggable optical transceivers, provided that they are mechanically and electrically supported by the Demarcation devices. In some implementations, a single S-ONU may be connected to more than one Demarcation devices depending on one or more factors, including local conditions, the deployment scenario or the operator choice.

In a DPoE Network such as the examples in FIGS. 2A and 2B, DPoE ONU devices, such as B-ONU devices, are of particular commercial interest, given that they allow for single-step retrofitting of existing, deployed Demarcation devices. For B-ONU devices, Demarcation devices operating currently with copper (HFC) or Coarse wavelength division multiplexing (CWDM) optical transceivers can be retrofitted. In order to prepare a Demarcation device for operation within the DPoE Network, the pluggable transceiver module can be configured to be replaced with the B-ONU module of the appropriate mechanical and electrical format. The DPoE-SP-ARCH standard provides the above feature and configuration of the B-ONU via the DPoE specific OAM. In case of S-ONUs, a Demarcation device can be connected to DPoE Network.

Currently, Version 1.0 of the DPoE specifications does not provide a mechanism for auto-configuration of the Demarcation device equipped with the B-ONU plugged in its receptacle or connected to an S-ONU. Without this auto-configuration, after the B-ONU is plugged in or S-ONU is connected to, all configuration actions on the Demarcation device are performed manually by an engineer, requiring in the majority of cases a truck roll to reconfigure customer services. In order to configure customer services on a Demarcation device with a D-ONU, an engineer creates, either manually or by using available automation tools, a service configuration file. Once the service configuration file is created and is ready, the service configuration file needs to be installed on the Demarcation device. Several installation methods may be used, including, among the others, (a) pre-load the configuration file into the device memory prior to deployment of the Demarcation device (green-field scenario only), (b) load the configuration file at the customer premises at the time of the deployment of the Demarcation device or at a later time, but requiring a truck roll, and (c) provide a memory storage device (e.g. pendrive) with the configuration file to the customer, while the deployed Demarcation device is equipped with customer-serviceable interface allowing for the upload and installation of the configuration file. Various other permutations of the above-referred examples are possible. The common feature of these mechanisms is the fact that they are not automated and they require manual intervention of the technical personnel and a potential truck-roll once the device has been fielded. As such, the services can be provisioned only statically and any changes to that configuration require a truck roll or interaction with the customer who cannot be typically expected to have necessary skills to perform an update to the configuration file on site.

Once the Demarcation device is configured, a communication path can be established between the Demarcation device (required to be equipped with an IP address) and the back-office system, a new configuration file can be downloaded directly into the Demarcation device using a number of mechanisms, with various flavours of data transfer protocols being used (e.g. TFTP, SFTP, HTTPS etc.).

The auto-configuration of Demarcation devices described in this document can be implemented in a way that overcomes the existing lack of auto-configuration of the Demarcation devices when equipped with a Bridge ONU (B-ONU) when plugged into the receptacle on a Demarcation device, or when connected to a Standalone ONU (S-ONU), defined in version 1.0 of the DPoE specifications. The described auto configuration mechanism can be used to enable the Demarcation device to be configured from the back-office system in IP and Metro Ethernet Forum (MEF) service configurations. This auto configuration can be used to automatically download new and updated configuration files to the same Demarcation device for automated service and configuration provisioning.

FIG. 3 shows an example of a method for providing auto configuration of a Demarcation device in a communication network based on DOCSIS provisioning over EPON. In this example, a Demarcation device and an optical network unit device connected to the Demarcation device are initialized. The Demarcation device is operated to establish a communication with the optical network unit device and to obtain configuration information of the optical network unit device. The Demarcation device is also operated to communicate to a back-office system in the network regarding information of the Demarcation device. The information includes capabilities associated with the Demarcation device. Next, the back-office system is operated to generate a service configuration file and to send the generated service configuration file to the Demarcation device. Subsequently, the Demarcation device is operated to process the service configuration file from the back-office system and to update communication services provided by the optical network unit device based on the service configuration file from the back-office system.

In implementations, an automated Demarcation device configuration process can include the following processing stages:
1. Startup of the Demarcation device and DPoE ONU which can be, e.g., a plugged in B-ONU device or connected S-ONU device.
2. Discovery of the DPoE ONU configuration information (including other vendor specific information) by the Demarcation device using the 802.1AB LLDP protocol with the DPoE specific type-length-value (TLV) values.
3. The Demarcation device reaches out to the back-office, announces its presence using, e.g., the Dynamic Host Configuration Protocol (DHCP), provides the backoffice system with additional information about itself, its capabilities etc., and requests a new service configuration file.
4. The back-office system responds to the DHCP request from the Demarcation device, generates the required service configuration file and sends the required service configuration file downstream to the Demarcation device across the DPoE Network using the dedicated L2 transmission path established previously.
5. The Demarcation device receives the service configuration file, parses the received file and configures the services, as needed.

FIGS. 4A and 4B show two examples for implementing the automated configuration of the demarcation devices based on the above 5 stages. The B-ONU in FIGS. 4A and 4B is shown as an example and can be replaced by another suitable DPoE ONU, such as S-ONU.

The DPoE Network between the MI, an interface between the DPoE ONU such as a B-ONU and the Demarcation device, and the backoffice system is configured to support a L2 configuration path, intended to relay DHCP request from the Demarcation device once the link between the Demarcation device and the DPOE ONU (e.g., B-ONU) is established and the configuration file for the Demarcation device. The L2 configuration path can be established in a manner that is consistent with the establishment of the point-to-point (P2P) Metro Ethernet Forum (MEF) services (E-LINE).

The DPoE System can implement a DHCP snooper/helper agent for picking up DHCP requests received from the L2 configuration path configured on the given DPoE System and forwarding it to the backoffice for proper handling. In some implementations, the DHCP server responsible for handling the DHCP requests from the Demarcation device may be separate from a DHCP server used for other purposes in the DPoE Network.

Referring to the automated configuration flow in the example in FIG. 4B, the details of the 6 stages are described below.

Stage 1

In Stage 1, the Demarcation device and the DPOE ONU device are powered on, whereas the DPOE ONU (e.g., B-ONU) is powered by the Demarcation device. An S-ONU might be powered on separately or be already powered at this stage. For simplicity of description, it is assumed that the Demarcation device and the S-ONU are powered on simultaneously. At this stage, both devices initialize and perform basic internal configurations, check-ups etc. required for their proper operation.

In this stage, the Demarcation device performs the discovery of the B-ONU plugged in the receptacle using the communication interface typically used by the pluggable transceivers used to manufacture the B-ONU devices. As an example, B-ONUs housed in SFP type transceivers use the I2C bus to exchange information between the Demarcation device and the optical transceiver. During the start-up phase, the Demarcation device verifies the presence, current administrative status and a series of other parameters as indicated in the memory map (including such parameters as temperature, bias current, manufacturer, version, model, power range, device status etc.), stored on a compliant transceiver and subject to separate standardization efforts. As an example, the SFF-8472 specification defines the memory map for the SFP compliant transceivers.

To distinguish the transceiver equipped with an EPON chipset (e.g., B-ONU) from other typical transceivers used for P2P CWDM/DWDM communication, the DPoE specific information can be read from any predefined location in the transceiver memory map. Several locations can be possible, including among the other: (a) any location in the vendor-specific memory space, (b) any location in the reserved memory space assuming that the respective standardization committee assigns particular data byte(s) for the exclusive use of DPoE. Either of the methods can be implemented and such implementation does not affect interoperability between devices from different vendors as long as a single method is used for all manufactured devices. Given the limited amount of information that needs to be stored in the B-ONU and used to identify the DPoE B-ONU from other transceivers, it is suggested that method (b) mentioned above is used.

The B-ONU identification information should contain among the others, (a) flag indicating DPoE support (when set), (b) DPoE version number (corresponding to e.g. phases of the DPoE project in CableLabs), (c) additional information e.g. version of the B-ONU that was plugged into the Demarcation device.

It is assumed that the available communication bus between the Demarcation device and the plugged in B-ONU device at the transceiver level i.e. I2C allows to perform selective read operations at bit level resolution required to properly read out the B-ONU identification information. If that is not the case, the location of the identification information is suggested to be byte-boundary aligned to ease the read and parsing processes for the host (Demarcation device).

Other transceiver form formats have their appropriate memory map definitions included in the respective standards e.g. SFF-8077i for XFP type B-ONUs. The location of such B-ONU identification information depends therefore on the type of the discovered optical transceiver, which is the first stage in the identification of the pluggable transceiver.

The Stage 1 process completes with the Demarcation device confirming the type of the plugged in transceiver. At this time, the Demarcation device should be able to distinguish the B-ONU from a standard P2P transceiver in the appropriate form factor. If the Demarcation device is connected to an S-ONU, there may be no need to perform any check-up and the Demarcation device can proceed directly to the next stage.

Stage 1A

The Stage 1A is a process that is carried out if when the Demarcation device fails (for any reason) to detect the B-ONU presence in the receptacle or when a standard CWDM/DWDM optical/cable transceiver is detected. In this process, the Demarcation device can load the appropriate start-up file and continue its operation. This process guarantees that the Demarcation device can still operate with existing types of transceivers.

Stage 2

In this stage, once the connected B-ONU has been fully identified or an S-ONU is connected, the Demarcation device operates to discover the basic layer 2 link configuration parameters for the connection between the Demarcation device and the DPoE ONU (e.g., B-ONU or S-ONU). The link parameters include the required encapsulation format, DPoE ONU port mode (encapsulation/transport), as well as additional information to make sure that the Demarcation device can successfully transmit the DHCP request to the back-office system and perform the secure file transfer for the service configuration file, if such a mechanism is requested by the operator.

To achieve that, the Demarcation device implements IEEE 802.1AB Link Layer Discovery Protocol (LLDP) Receiver agent, capable of receiving the LLDPDUs from the DPoE ONU, parsing the DPoE specific information TLV and performing its location configuration. The Demarcation device also implements the IEEE 802.1AB LLDP Transmitter agent to support bidirectional LLDP transmission, e.g., using the IEEE 802.3AB-2009 standard.

The DPoE ONU implements the IEEE 802.1AB LLDP Transmitter agent, capable of generating the LLDPDU with attached DPoE specific TLV, containing information about the link configuration requirements for the given B-ONU (Information string). The structure of this TLV is presented in FIG. 5. The OUI is the value assigned to CableLabs (0x001000), TLV type is reserved by IEEE 802.1AB, while the size depends on the actual length of the Information string. The internal structure of the Information string depends on the Sybtype, as defined in Tab. 1 below. Other Subtype values are reserved for future application.

TABLE 1

| \multicolumn{3}{c}{LLDPDU types} | | |
| --- | --- | --- |
| Name | Subtype | Information field structure |
| Version | 0x01 | 2 bytes long<br>Includes 1 byte of major and 1 byte of minor version information |
| Mode | 0x02 | 1 byte long<br>Includes indication of the mode used for L2 transport path i.e. whether encapsulation or transport mode is used |
| Bridge configuration | 0x03 | 19 bytes long<br>Indicates the type of the VLAN tagging used for L2 transport path i.e. whether IEEE Std 802.1ad, IEEE Std 802.1ah I-Tag Only, or IEEE Std 802.1ah I-Tag + B-Tag is used. It also contains fields for individual tag values. |

The DPoE ONU also implements the 802.1AB LLDP receiver agent to support bidirectional LLDP transmission in accordance with the IEEE 802.3AB-2009 standard.

Once the DPoE ONU comes online and is successfully configured by the network operator, the LLDP Transmitter agent starts sending LLDPDUs (using multicast destination address, as allowed by the 802.1AB LLDP standard) on the port connected to the Demarcation device. In case of S-ONUs equipped with multiple MU/MI ports on the User Network Interface (UNI) side, each port is able to operate an independent LLDP agent to allow for transmission of the LLDPDU across the link to the connected Demarc. The process can be continuous and its frequency can depend on the implementation. The operator is provided with the means to enable/disable LLDP transmission on each of the exposed MU/MI interfaces, allowing the operator to control which of the said ports support he automated configuration and which do not.

After the Demarcation device MAC receives an LLDPDU with the DPoE specific TLV, the Demarcation device MAC parses the received LLDPDU and identifies the requirements for the port configuration to allow for the transmission of the DHCP request to the backoffice system, including among the others: (a) whether the DPoE ONU is configured to operate in the encapsulation or transport mode, (b) what virtual local area network VLAN ID, known as VID, needs to be applied to the DHCP request on the Demarcation device to allow for successful forwarding through the DPoE ONU, etc. The Demarcation device uses this information to configure its port into a state allowing for proper forwarding of frames through the DPoE ONU onto the DPoE Network. DHCP requests generated by the software agent operating on the Demarcation device are processed and encapsulated in a manner consistent with the DPoE ONU default configuration requirements as delivered using the DPoE specific TLV in the LLDPDU. In case of S-ONU, each MU/MI type port can be configured with a dedicated L2 configuration path parameters, so that each Demarcation device potentially connected to such ports is uniquely recognized by the backoffice system and be configured independently.

In order to avoid a lock-down of the Demarcation device, it is recommended for the D-ONU not to start any LLDP sessions until it powers up, completes any initialization and boot sequences, giving it enough time to initialize itself before starting transmission of the LLDPDUs on the port connected to the DEMARC. Subsequently, the TTL for the LLDP information transmitted by the DPoE ONU is recommended to be equal to at least 2 seconds, requiring periodic refresh to make sure that the DPoE ONU is still operational. After a certain number of consecutive LLDP refresh failures, e.g., 5 times (N=5 in FIGS. 4A and 4B), the LLDP information validity expires)=and the Demarcation device is to reboot to re-establish communication with the DPoE ONU.

In case of any fatal error condition detected during the operation of this process, the Demarcation transition to STAGE 7 in FIG. 4B where Demarcation device recovers from a fatal stage error condition. It is up to the Demarcation device implementor to determine what constitutes a fatal error during the operation of the device.

Stage 3

In the third stage, the Demarcation device generates the DHCP request. The DHCP discovery/request sourced from the Demarcation device is suggested to carry a number of populated option fields, including among the others, the unique identification of the Demarcation device, comprising its MAC address, and optionally, its public certificate or any other unique identifier allowing the back-office system to distinguish this particular device from any other such device on the network.

Additionally, the DHCP discovery/request may also include a list of Demarcation device capabilities. The structure of the DHCP discovery/request and the contained options and sub-options should be specific for the given Demarcation device and provide enough information to the back-office system properly establish capabilities of this device and generate the service configuration file accordingly.

This DHCP request is broadcast on the Demarcation device port connected to the DPoE ONU using the default configuration requirements as delivered using the DPoE specific TLV in the LLDPDU. The DPoE ONU does not need to learn the Demarcation device MAC address given that the default behaviour configured for the Layer 2 transport path established between the backoffice and the Demarcation device is based on forwarding based on 802.1ad/802.1ah tags.

In order to avoid lock-out caused by misconfiguration of the B-ONU, mechanical/optical failure etc., the Demarcation device can be configured to implement a timer, which is loaded on the power on with the value defined by the operator in the configuration file. This timer measures the duration of time the Demarcation device remains in this stage, waiting for the target service configuration file from the back-office system. If the service configuration file is not received by the Demarcation device by the expiration of the timer, the Demarcation device signals this fact to the user by, e.g. displaying a distinct pattern on available LED indicators or using distinct sound signals and then initiates a power cycle operation to restart the auto-configuration process. After a number of consecutive power cycles, for example, 5 cycles (N=5), as defined in the initial configuration file loaded by the operator, the device can be operated to power down and await user intervention.

Once the Demarcation device completes the DHCP process, it has obtained an Uniform Resource Identifier (URI) for the service configuration file from the respective URI option from the DHCP message. When this information is obtained, Stage 3 is complete. If the IP address and configuration file information are not acquired, the Demarcation device applies the retry mechanism discussed before.

In case of any fatal error condition detected during the operation of this process, the Demarcation transition to Stage 7 in FIG. 4B where Demarcation device recovers from a fatal stage error condition. It is up to the Demarcation device implementor to determine what constitutes a fatal error during the operation of the device.

Stage 4

In the fourth stage, the back-office system receives the request for a service configuration file from the Demarcation device, together with a series of identification parameters for this device by the way of the DHCP option relay. Using the existing back-office automation processes, the Demarc-device specific configuration file is generated, containing among the others definitions of individual service flows, Quality of Service (QoS) parameters, Virtual Local Area Network (VLAN) configuration etc. Such a service configuration file is then delivered to the DPoE System and transmitted downstream to the particular DPoE ONU (using DPoE Network as a transport layer, as defined in the DPoE-SP-ARCH), with the appropriate VLAN tagging. Once at the DPoE ONU, the configuration file is forwarded to the Demarcation device using the default forwarding rules configured on the DPoE ONU for the given L2 transport path.

Successful download of the DEMARCATION DEVICE configuration file represents the completion of Stage 4. If for any reason the configuration file fails to be downloaded, the Demarcation device applies the retry mechanism discussed before.

In case of any fatal error condition detected during the operation of this process, the Demarcation transition to Stage 7 in FIG. 4B where Demarcation device recovers from a fatal stage error condition. It is up to the Demarcation device implementor to determine what constitutes a fatal error during the operation of the device.

Stage 5

In the fifth stage, the Demarcation device, upon receipt of the configuration file, parses the received configuration file, verifies for any potential errors and processes it, performing its local configuration, opening necessary communication paths between the Demarcation device and the DPoE ONU across the MI interfaces as needed. The default configuration path between the Demarcation device and the DPoE ONU established in stages 2-3 remains open as long as the Demarcation device (and the DPoE ONU) are powered on. This allows the back-office system to update the configuration on the Demarcation device as needed e.g. establish new services for the customer, perform modifications, changes to QoS policies etc. without the need for truck rolls. The DPoE ONU maintains the LLDP on the Demarcation device—DPoE ONU link operational as long as it is powered, using the LLDP refresh mechanism.

Application of the configuration file represents completion of Stage 5 and the DEMARC transitions to Stage 6. If the configuration file is unable to be applied, the Demarcation device applies the retry mechanism discussed before.

In case of any fatal error condition detected during the operation of this process, the Demarcation transition to Stage 7 in FIG. 4B where Demarcation device recovers from a fatal stage error condition. It is up to the Demarcation device implementor to determine what constitutes a fatal error during the operation of the device.

Stage 6

Stage 6 represents a normal operating mode for the Demarcation device. In this stage, either a newly downloaded configuration file has been applied, or a previously saved configuration file has been loaded. In either case, the Demarcation device is in the normal operating mode. In this stage, the D-ONU continually transmits the LLDP information on the port connected to the Demarcation device periodically, e.g., at least once every two (2) seconds, to provide an indication to the Demarcation device that the D-ONU is still operational, and also to provide LLDP configuration information if the Demarcation device reboots at any time.

Stage 7

Stage 7 represents a state in which the Demarcation device recovers from a fatal stage error condition. In this process, the Demarcation device loads a previously saved configuration file and continues operation.

The described mechanism for configuration of the DPoE ONU connected to the Demarcation device is fully automated and can be used to eliminate truck rolls under normal operating conditions. The described mechanism can be applicable to any types of pluggable B-ONU devices, including among the others the SFP, SFP+ or XFP formats, the capabilities of which can be discovered by the Demarcation device using the same communication protocol i.e. I2C. The current SFP, SFP+ and XFP memory map specification contain a number of reserved bits, any of which can be used for definition of the B-ONU capability. The described mechanism can be used to allow for operation in case of multiple Demarcation device devices connected to MU/MI ports on an S-ONU.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A method for providing auto configuration of a Demarcation device in a communication network based on Data Over Cable Service Interface Specification (DOCSIS) provisioning over Ethernet Passive Optical Network (EPON), comprising:
   initializing the Demarcation device and an optical network unit device connected to the Demarcation device;
   performing, by the Demarcation device, port configuration to allow communication to the optical network unit device, wherein the communication comprises forwarding frames from the Demarcation device to the optical network unit;

establishing, by the Demarcation device, a communication with the optical network unit device and obtaining configuration information of the optical network unit device;

communicating, by the Demarcation device, to a back-office system in the network, information regarding the Demarcation device, the information including capabilities associated with the Demarcation device;

receiving, at the Demarcation device, the service configuration file from the back-office system, wherein a timer, implemented at the Demarcation device, restarts the Demarcation device when the service configuration file is not received prior to expiration of the timer and after the timer restarts the Demarcation device for a predetermined number of times, the predetermined number of times defined in the service configuration file, the Demarcation device powers down and awaits user intervention; and processing, at the Demarcation device, the service configuration file received from the back-office system and automatically updating communication services provided by the optical network unit device based on the service configuration file received from the back-office system.

2. The method as in claim 1, wherein:

the communication established between the Demarcation device and the optical network unit device is based on IEEE 802.1AB Link Layer Discovery Protocol (LLDP) protocol with the DOCSIS Provisioning over EPON specific type-length-value (TLV) values.

3. The method as in claim 1, comprising:

utilizing, by the Demarcation device, Dynamic Host Configuration Protocol (DHCP) to communicate with the back-office system.

4. The method as in claim 1, comprising:

utilizing, by the back-office system, a dedicated L2 transmission path to send the service configuration file to the Demarcation device.

5. The method as in claim 1, wherein:

the optical network unit device is a bridge optical network unit device that is plugged to the Demarcation device.

6. The method as in claim 1, wherein:

the optical network unit device is connected to the Demarcation device via a generic data communication link.

7. The method as in claim 1, wherein:

the optical network unit device is connected to at least another Demarcation device in the communication network.

8. A communication network based on Data Over Cable Service Interface Specification (DOCSIS) provisioning over Ethernet Passive Optical Network (EPON), comprising:

a back-office system;

an Ethernet Passive Optical Network including Demarcation devices and optical network unit devices; and a network system coupled between the back-office system and the Ethernet Passive Optical Network to provide the Data Over Cable Service Interface Specification (DOC SIS) provisioning over the Ethernet Passive Optical Network, the system operative for:

initializing a Demarcation device included in the Demarcation devices and an optical network unit device connected to the Demarcation device;

performing, by the Demarcation device, port configuration to allow proper communication to the optical network unit device, wherein the communication comprises forwarding frames from the Demarcation device to the optical network unit;

establishing, by the Demarcation device a communication with the optical network unit device and to obtain configuration information of the optical network unit device;

communicating, by the Demarcation device to the back-office system in the network regarding information of the Demarcation device, the information including capabilities associated with the Demarcation device;

receiving, at the Demarcation device, the service configuration file from the back-office system, wherein a timer, implemented at the Demarcation device, restarts the Demarcation device when the service configuration file is not received by expiration of the timer and after the timer restarts the Demarcation device for a predetermined number of times, the predetermined number of times defined in the service configuration file, the Demarcation device powers down and awaits user intervention; and processing, at the Demarcation device, the service configuration file from the back-office system and automatically updating communication services provided by the optical network unit device based on the service configuration file from the back-office system.

9. The network as in claim 8, wherein:

the communication established between the Demarcation device and the optical network unit device is based on IEEE 802.1AB Link Layer Discovery Protocol (LLDP) protocol with the DOC SIS Provisioning over EPON specific type-length-value (TLV) values.

10. The network as in claim 8, comprising:

utilizing, by the Demarcation device, Dynamic Host Configuration Protocol (DHCP) to communicate with the back-office system.

11. The network as in claim 8, comprising:

utilizing, by the back-office system, a dedicated L2 transmission path to send the service configuration file to the Demarcation device.

12. The network as in claim 8, wherein:

the optical network unit device is a bridge optical network unit device that is plugged to the Demarcation device.

13. The network as in claim 8, wherein:

the optical network unit device is connected to the Demarcation device via a generic data communication link.

14. The network as in claim 8, wherein:

the optical network unit device is connected to at least another Demarcation device in the communication network.

15. The method as in claim 1, further comprising:

loading, at the Demarcation device, a previously saved configuration file upon encountering a fatal error; and continuing operation of the Demarcation device.

16. The network as in claim 8, wherein the network system is further operative for:

loading, at the Demarcation device, a previously saved configuration file upon encountering a fatal error; and continuing operation of the Demarcation device.

* * * * *